United States Patent
Riviere et al.

(10) Patent No.: US 11,441,486 B2
(45) Date of Patent: Sep. 13, 2022

(54) SEMICONDUCTOR BODY FOR A SPARK PLUG OF A TURBINE ENGINE

(71) Applicant: SAFRAN AIRCRAFT ENGINES, Paris (FR)

(72) Inventors: Thomas Gérard Daniel Riviere, Moissy-Cramayel (FR); Guillaume Thierry Richen, Moissy-Cramayel (FR); David Gino Stifanic, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 117 days.

(21) Appl. No.: 16/797,804

(22) Filed: Feb. 21, 2020

(65) Prior Publication Data
US 2020/0271058 A1 Aug. 27, 2020

(30) Foreign Application Priority Data
Feb. 22, 2019 (FR) ........................... 1901830

(51) Int. Cl.
*F02C 7/266* (2006.01)
*H01T 13/40* (2006.01)

(52) U.S. Cl.
CPC .............. *F02C 7/266* (2013.01); *H01T 13/40* (2013.01); *F05D 2220/32* (2013.01)

(58) Field of Classification Search
CPC . F02C 7/264; F02C 7/266; H01T 1/24; H01T 1/22; H01T 13/38; H01T 13/39; H01T 13/40; H01T 13/28; H01T 13/34
See application file for complete search history.

(56) References Cited

U.S. PATENT DOCUMENTS 4,007,391 A * 2/1977 Baker ...................... H01T 13/52
313/131 A
5,204,579 A * 4/1993 Oshima ................. C04B 35/111
313/143

(Continued)

FOREIGN PATENT DOCUMENTS

DE 3533124 A1 3/1987
DE 19843712 * 3/1999

(Continued)

OTHER PUBLICATIONS

Rapport De Recherche Preliminaire and Opinion completed Nov. 28, 2019, for French Application No. 1901830, filed Feb. 22, 2019, 7 pages.

(Continued)

*Primary Examiner* — Gerald L Sung
(74) *Attorney, Agent, or Firm* — Christensen O'Connor Johnson Kindness

(57) ABSTRACT

The invention relates to a semiconductor body revolving around a main axis (A) for a spark plug of a turbine engine, the semiconductor body comprising a baseplate and an upper portion extending from the baseplate along the main axis, the baseplate comprising a bottom surface substantially defined in a plane perpendicular to the main axis and a first conical surface intended to cooperate by form-fitting at least partially with a contact surface of an outer electrode of the spark plug. According to the invention, the upper portion comprises an interface located opposite the bottom surface along the main axis (A) and featuring a profile that is at least partially corrugated.

17 Claims, 3 Drawing Sheets

(56) References Cited

U.S. PATENT DOCUMENTS

| | | | |
|---|---|---|---|
| 5,434,741 A | 7/1995 | Mulkins et al. | |
| 6,583,537 B1* | 6/2003 | Honda | H01T 13/41 313/136 |
| 2006/0076865 A1* | 4/2006 | Shibata | H01T 13/41 313/143 |
| 2009/0178385 A1* | 7/2009 | Sandelis | F02C 7/266 60/39.821 |
| 2013/0078585 A1* | 3/2013 | Chatenet | F02F 1/242 431/258 |
| 2013/0327013 A1* | 12/2013 | Leglaye | F02C 7/266 313/11.5 |
| 2015/0222097 A1 | 8/2015 | Berton et al. | |
| 2017/0025824 A1* | 1/2017 | Mixell | H01T 19/00 |
| 2019/0027903 A1 | 1/2019 | Suckewer | |

FOREIGN PATENT DOCUMENTS

| | | |
|---|---|---|
| FR | 2641136 A1 | 6/1990 |
| FR | 3017255 A1 | 8/2015 |
| FR | 3049780 A1 | 10/2017 |
| GB | 949978 A | 2/1964 |

OTHER PUBLICATIONS

Great Britain Search Report dated Aug. 6, 2020, issued in corresponding Great Britain Application No. GB2001873.5; 1 page.

* cited by examiner

SEMICONDUCTOR BODY FOR A SPARK PLUG OF A TURBINE ENGINE

CROSS REFERENCE TO RELATED APPLICATION

This application claims priority under 35 U.S.C. § 119 to French Patent Application No. 1901830, filed Feb. 22, 2019, which is herein incorporated by reference in its entirety.

FIELD OF THE INVENTION

The present invention relates to the general field of aeronautics and in particular to spark plugs of the semiconductor type for a turbine engine.

BACKGROUND

Generally speaking, a turbine engine comprises, from upstream to downstream in the flow direction of the fluids, at least one compressor, one combustion chamber and at least one turbine. The combustion chamber receives fuel through injectors and a portion of the air coming from the compressor, which is then mixed with the fuel, this mixture then burning in the combustion chamber. The ignition of the combustion chamber is provided by at least one spark plug arranged partially inside the combustion chamber and able to generate a spark. The spark plug is generally arranged in a low position for turbojets.

Spark plugs of the semiconductor type are becoming widespread for turbine engines and comprise an elongate body secured to the wall of the combustion chamber, the free end of which passes through the wall located in the combustion chamber. The free end comprises a semiconductor body housed between a portion of a central electrode that extends inside the body and an outer electrode, referred to as ground electrode, with which the semiconductor body is in contact to create sparks. The semiconductor body features a general conical shape that fits partially with the shape of the outer electrode. The spark plug also comprises an insulating element intended to electrically insulate the central electrode from the body of the spark plug, which is also secured to a conical surface of the semiconductor body. In particular, the insulating elements enable the ceramic body to bear against a contact surface of the outer electrode. This type of spark plug is described in documents FR-A1-2 641 136, FR-A1-3 017 255, FR-A1-3 049 780 and U.S. Pat. No. 5,434,741.

It can happen that the insulating element becomes detached from the semiconductor body; this negatively affects the lifecycle of the spark plugs, which must be approximately 800 hours. Because of this disadvantage, the life expectancy of spark plugs is now nearer to one hundred hours. This loosening can occur because of vibrations of the turbine engine or because of impacts by various members against the wall of the combustion chamber that supports the spark plugs. When the semiconductor body is detached from the insulating element, it is displaced by vibrations, which causes a phenomenon of friction erosion against the insulating element. In particular, the semiconductor body rotates about the central electrode under the effect of the vibrations. It may happen that the insulating element itself is damaged and the entire spark plug assembly then needs to be replaced. The wear of the semiconductor body increases its clearance with the ground electrode, until the gap becomes too significant to allow a spark to be generated. Contact is then lost between the semiconductor and the ground electrode.

SUMMARY

The object of the present invention is to provide a semiconductor body that improves and maintains the physical contact between the semiconductor body and the outer electrode of a spark plug.

This goal is achieved according to the invention thanks to a semiconductor body revolving around a main axis for a spark plug of a turbine engine, the semiconductor body comprising a baseplate and an upper portion extending from the baseplate along a main axis, the baseplate comprising a bottom surface substantially defined in a plane perpendicular to the main axis and a first conical surface intended to cooperate by form-fitting with a contact surface of an outer electrode of the spark plug, the upper portion comprising an interface opposite the bottom surface along the main axis and featuring a profile that is at least partially corrugated.

The solution thereby achieves the aforementioned objective. In particular, such an interface with a corrugated profile increases the contact and attachment surface between the insulating element and the semiconductor body provided on a spark plug, thereby increasing the mechanical capacity of the attachment. The arrangement of this interface prevents the possible rotation and/or displacement and therefore early wear of the semiconductor body that could affect the clearance between the outer electrode and the semiconductor body at the level of the contact surface. Furthermore, it maintains the semiconductor body in constant contact with the insulating element and guarantees sufficient contact when the turbine engine undergoes vibrations (which tend to rotate the semiconductor), in order to ensure the creation of sparks.

The semi-conductor body also comprises one or several of the following features, taken individually or in combination:
- the upper portion comprises a peripheral surface that is substantially cylindrical around the main axis and that delimits the interface.
- the interface comprises a protruding rib along the main axis.
- The rib extends in a plane containing the main axis.
- the rib has a cylindrical external surface with a cylindrical axis that is perpendicular to the main axis.
- the interface comprises two protuberance that are diametrically opposed and arranged on either side of the rib along a plane perpendicular to the plane of the surface of the bottom.
- each protuberance has a conical cross-section in a plane that is perpendicular to the cylindrical axis.
- the semiconductor is made out of a ceramic material.
- the interface features corrugation or waves that rise or fall about the main axis along a circumferential direction.

The invention also relates to a spark plug of the semiconductor type for a turbine engine, the spark plug comprising a free cylindrical end that extends along a main axis, the free end comprising, centred on the main axis, a central electrode, an outer electrode and a semiconductor body that features any one of the abovementioned features and that is arranged between the central electrode and the outer electrode, a predetermined radial clearance being provided between the semiconductor body and the outer electrode, the spark plug further comprising an insulating element intended to insulate the central electrode from the outer electrode and to provide a support for the semiconductor body, on which the latter is secured, at least partially against a contact surface of the outer electrode substantially along the main direction.

According to an advantageous feature of the spark plug, the insulating element is secured to the interface of the semiconductor body by means of glue, such as cement.

According to another advantageous feature that is in no way limiting, the predetermined radial clearance ranges from 0 to 0.03 mm.

The invention also relates to a combustion chamber for a turbine engine comprising at least one spark plug that features at least any one of the above features.

The invention also relates to a turbine engine comprising a combustion chamber such as described above and/or at least one spark plug having any one of the above features.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The invention is better understood, and other purposes, details, features and advantages of this invention will become clearer upon reading the following detailed explanatory description relating to the embodiments of the invention, provided as examples and not limited thereto, and with reference to the appended schematic drawings, in which.

DETAILED DESCRIPTION

Figure 1:
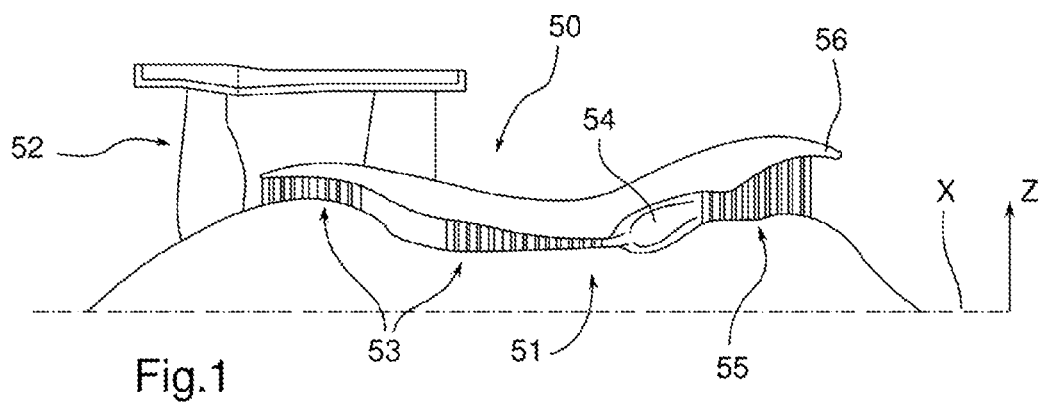
FIG. 1 is an axial cross-section view of an example of a turbine engine to which the invention applies.

FIG. 1 is an axial cross-section view along the longitudinal axis X of a turbine engine to which the invention applies. The turbine engine shown in the figure is a bypass turbine engine 50. Naturally, the invention is not limited to this type of turbine engine.

This turbine engine 50 generally comprises a gas generator 51, upstream from which a fan 52 is installed.

In the present invention and more generally, the terms "upstream" and "downstream" are defined with respect to the direction of travel of the fluids through the turbine engine, and in this case along the longitudinal axis X.

The gas generator 51 comprises a gas compressor 53 assembly (that can comprise a low-pressure compressor and a high-pressure compressor), a combustion chamber 54, and a turbine assembly 55 (that can comprise a high-pressure turbine and a low-pressure turbine). The fan 52 generates a primary air flow that circulates through the gas generator 51, and a secondary flow circulating around the gas generator. The turbine engine 50 further comprises an exhaust pipe 56, located downstream from the gas generator 51, through which the primary flow and the secondary flow are ejected outside of the turbine engine, in particular into the atmosphere.

Figure 2:
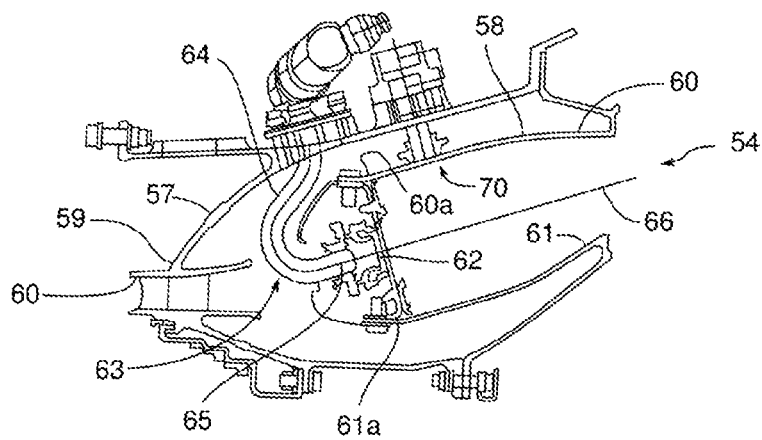
FIG. 2 is an axial cross-section view of an example of a combustion chamber of a turbine engine according to the invention.

Generally, and as illustrated in FIG. 2, the combustion chamber 54 comprises a radially external crankcase 57 and a radially internal crankcase 58 that are each centred on the longitudinal axis.

The terms "internal", "inner", "external", "outer", "radial" and "radially" are defined with respect to a radial axis Z perpendicular to the longitudinal axis X about which the turbine engine extends.

The radially external crankcase 57 surrounds the radially internal crankcase 58 and forms at an upstream end 59 thereof a duct 60 through which the primary air flow, having exited the compressor 53, enters into the combustion chamber 54. The radially internal crankcase 58 comprises in particular a radially external ferrule 60 and a radially internal ferrule 61. The combustion chamber also comprises a bottom 62 that connects the radially external and internal ferrules 60, 61 by their respective upstream ends 60a, 61a. The combustion chamber 54 here comprises means 63 to inject fuel therein. These injection means 63 comprise one or several injectors 64 that are mounted on the radially external crankcase 57 and distributed evenly about the longitudinal axis X.

Each injector 64 comprises a spraying nozzle 65 that opens onto the bottom 62 of the combustion chamber and that is oriented along an injection axis, along which a mixture of air flow and fuel also circulates inside the combustion chamber 54. This injection axis 66 is typically at an angle with respect to the longitudinal axis X. The bottom 62 of the combustion chamber 54 is substantially located in a plane that is perpendicular to the injection axis 66.

The combustion chamber 54 is completed by an ignition system 70 of the combustion chamber 54. The ignition system 70 comprises at least one spark plug 1 that is mounted on the wall of the combustion chamber. More accurately, the spark plug 1 is arranged downstream from the bottom 62 of the combustion chamber where the mixture of fuel and air is ignited by an electrical arc or a spark. In other words, the spark plug is located downstream from the fuel injectors 64. Typically, the spark plug 1 is mounted on the wall of the radially external crankcase and extends transversally in the combustion chamber so that its free end 2 passes through one of the radially external and internal ferrules and opens onto the ignition zone.

Figure 3:
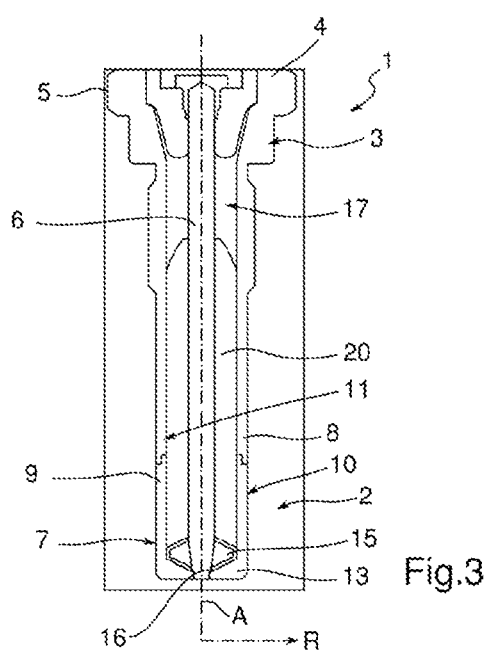
FIG. 3 is an axial and partial cross-section view of an example of a spark plug for a turbine engine according to the invention.
Figure 4:
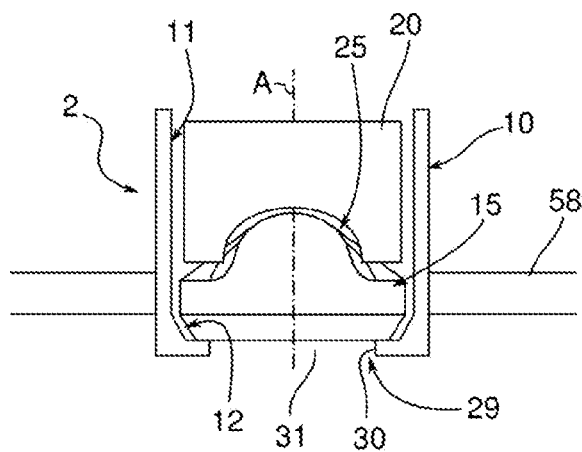
FIG. 4 shows, in an axial cross-section and detailed view, a free end of an example of a spark plug mounted on a wall of the combustion chamber of a turbine engine according to the invention.

FIGS. 3 and 4 show a spark plug 1 of the semiconductor type enabling ignition of the mixture of air and fuel. The spark plug 1 comprises a tubular body 3 that extends along a main axis A. The latter is transverse with respect to the longitudinal axis and the axis 66. The body comprises at a proximal end 4, a soleplate 5 that extends radially from the body and that is intended to be secured to the wall of the combustion chamber 54. The body 3 receives, at the level of the proximal end 4, an ignition cable that is included in the ignition system. The ignition cable is in this case screwed inside this part of the body of the proximal end 4. The inner wall of the proximal end 4 comprises a thread that engages with that of the ignition cable.

A portion of the wall of the body 3 comprises an outer thread (not shown) enabling the attachment of the spark plug in the wall of the combustion chamber 54. The body 3 is made of a metallic material, such as steel.

The spark plug 1 also comprises a central electrode 6, or inner electrode, and an outer electrode 7, or ground electrode, arranged at a distance from the central electrode 6. The central electrode 6 extends along the main axis A inside the body and is centred on this axis A. The central electrode 6 is made of a conductive material, advantageously of a metal or a metal alloy. The outer electrode 7 is arranged at the distal end 8 of the body and features a tubular shape centred on the main axis A. The outer electrode 7 delimits the free end 2 of the spark plug.

As can be seen in FIG. 3, the outer electrode 7 comprises a first end 9 that engages with the distal end 8 of the body. The outer electrode 7 has an outer surface 10 that is flush with that of the body of the spark plug. The outer electrode 7 features an inner surface 11 arranged opposite (along a radial direction R perpendicular to the main axis A) the outer surface 10. The inner surface 11 features a portion of contact surface (see FIG. 4) that is conical towards the second end 13 of the outer electrode 7. This second end 13 faces the first end 8 of the outer electrode 7 along the main axis.

According to the example shown, the outer electrode 7 is made of a metallic material or of a metal alloy. In this case, the outer electrode 7 part is separate from the body of the spark plug. The outer electrode extends the body 3 along the main axis A. Alternatively, the outer electrode is made integrally with the body (i.e. made as a single part).

Figure 5:
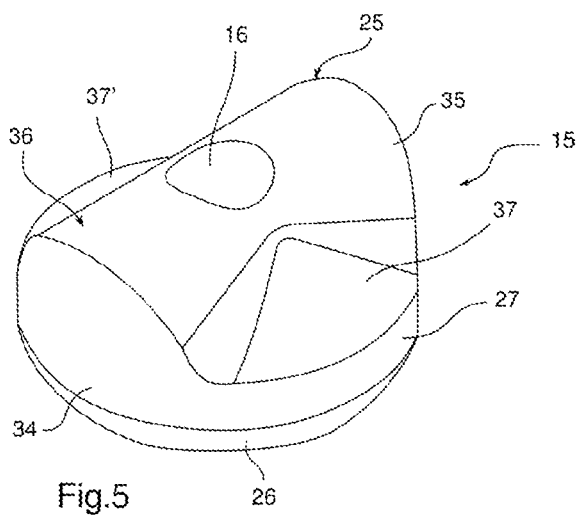
FIG. 5 is a perspective view of an example of a semiconductor body for a spark plug of a turbine engine according to the invention.
Figure 6:
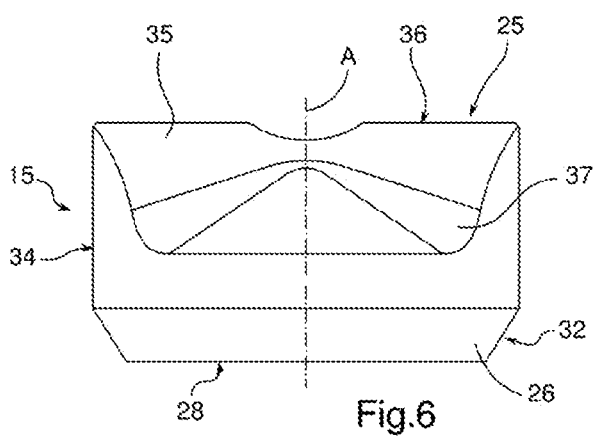
FIG. 6 is a side view of the semiconductor body shown in FIG. 5.
Figure 7:
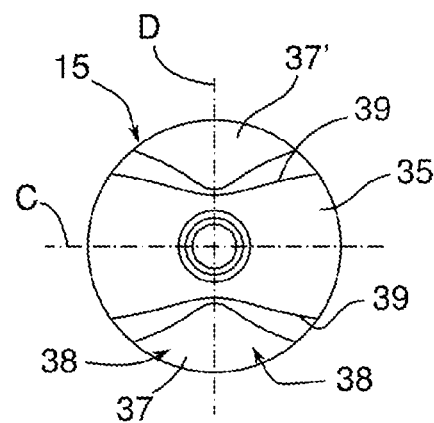
FIG. 7 is a top view of the semiconductor body shown in FIG. 5.
Figure 8:
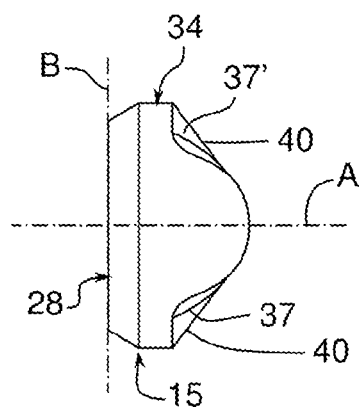
FIG. 8 is a view from another side of the semiconductor body of FIG. 5.
Figure 9:
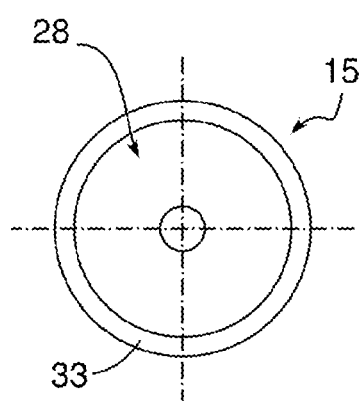
FIG. 9 is a bottom view of the semiconductor body of FIG. 5.

The spark plug 1 is completed by a semiconductor body 15 that revolves around the main axis. The semiconductor body 15 is advantageously made of ceramic. The semiconductor body 15 is located at the level of the free end 2 of the spark plug (and even at the second end 13 of the outer electrode). The semiconductor body 15 is arranged (in this case along the radial direction R) between the outer electrode 7 and the central electrode 6. The latter therefore comprises a bore 16 (see FIG. 5) that is coaxial with the main axis and is intended to receive the central electrode 6.

The spark plug 1 further comprises an insulating element 20 that is intended to insulate electrically the central electrode 6 from the outer electrode 7 of the spark plug. The insulating element 20 extends here along the main axis and is provided with a bore along an axis centred on the main axis, and that is intended to receive the central electrode 6. This insulating element 20 is arranged (here radially) between the wall of the body (and of the outer electrode) and the central electrode 6. The insulating element 20 keeps the semiconductor 15 pressed against the outer electrode 7. For this purpose, the spark plug comprises a sealing part 17 which, when it is installed in the spark plug, causes the insulating element 20 to bear against the semiconductor body 15 along the main axis. In other words, the insulating element 20 is arranged between the semiconductor body and the sealing part 17.

Advantageously, the sealing part 20 is made of a ceramic material. As for the sealing part 17, it is made out of glass. The sealing part ensures the protection of the members located inside the spark plug 20.

Advantageously, the insulating element 20 is also attached to the semiconductor body 15 at the level of an interface 25, detailed below in this description, intended to prevent displacement of the semiconductor body in the spark plug.

We are now going to provide a more detailed description of the semiconductor body, with reference to FIGS. 5 to 9.

The semiconductor body 15 comprises a baseplate 26 and an upper portion 27 extending from the base along the main axis A. The baseplate 26 comprises a bottom surface 28 that is defined in a plane B that is perpendicular to the main axis A. This bottom surface 18 is arranged opposite an opening 29 defined by the edge 30 of the outer electrode 7 (see FIG. 4). In particular, the bottom surface 28 defines with a cylindrical wall of the edge 30 of the main axis a cavity 31 where the spark that ignites the mixture of air and fuel is created.

The baseplate 26 further comprises a first surface 32 intended to cooperate, at least partially by form-fitting, with the conical contact surface 12 of the outer electrode 7. In other words, the first surface 32 has a conical shape. This configuration maintains the semiconductor body inside the spark plug. However, a predetermined radial clearance is provided between at least a part of the contact surface 12 (of the inner surface 11 of the outer electrode 7) and the first surface 32 of the semiconductor body 15 so as to enable physical contact between the contact surface 12 and the first surface 32, and therefore to create the spark to ignite the mixture of air and fuel. The predetermined radial clearance ranges from 0 to 0.03 in order to ensure the creation of a spark.

The upper portion 27 has a circular base 33 (see FIG. 9) that is coaxial with the main axis. In this example, the base 33 has a diameter that is greater than that of the baseplate 26 The upper portion also comprises the interface 25 that is located opposite the bottom surface 28. The interface 25 features a profile that is at least partially corrugated so as to increase the contact surface between the electrically insulating element 20 and the semiconductor body 15 and to prevent the displacement and/or rotation of the semiconductor body in the spark plug.

The upper portion 27 comprises a peripheral surface 34 that is substantially cylindrical around the main axis A. The peripheral surface 34 delimits the interface 25. It further rises from the base 33 of the upper portion 27. As we can see in FIG. 6, the peripheral surface extends the first surface 32.

The interface 25 comprises more specifically a rib 35 that is in this case centrally protruding along a main axis (along the opposite direction of the base). The rib 35 is elongated according to the diameter of the body and intersects with the main axis. Similarly, the rib 35 features a cylindrical outer surface 36 around a cylindrical axis perpendicular to the main axis A. Furthermore, the cylindrical axis is defined in a plane parallel with the plane B of the bottom surface 28.

As can also be seen in the figures, the interface 25 comprises two protuberances 37, 37' that are located diametrically opposite one another. In particular, these protuberances 37, 37' are arranged on either side of the rib 35 along a plane C containing the main axis A and along which the rib 35 extends. Each protuberance 37, 37' features a conical section in a plane D perpendicular to the plane C in which the rib 35 extends. The protuberances 37, 37' rise from the base at the level of the longitudinal sides 39 that delimit the rib 35.

Each protuberance 37, 37' features two sides 38 that meet to create a summit ridge 40 (defined in the plane D). The sides 38 are advantageously curved. In the present example, and with reference to FIG. 8, the maximum height of the summit ridge 40 is smaller than the height of the rib 35 along the main axis.

We can also see that each protuberance 37, 37' comprises an outer surface connecting to the cylindrical outer surface of the rib 33.

Thus, the interface 25 features corrugation or waves that rise or fall about the main axis A along a circumferential direction. In other words, it should be understood that the corrugated interface features alternating summits and troughs.

The insulating element 20 features an attachment surface that engages by form-fitting with the interface 25 of the semiconductor body 15.

The attachment of the insulating element 20 and of the semiconductor body 15 is advantageously achieved with glue, such as cement for example.

While illustrative embodiments have been illustrated and described, it will be appreciated that various changes can be made therein without departing from the spirit and scope of the invention.

The invention claimed is:

1. A semiconductor body revolving around a main axis (A) for a spark plug of a turbine engine, the semiconductor body comprising a baseplate and an upper portion extending from the baseplate along the main axis, the baseplate comprising a bottom surface substantially defined in a plane (B) perpendicular to the main axis and a first conical surface intended to cooperate at least partially by form-fitting with a contact surface of an outer electrode of the spark plug, wherein the upper portion comprises an interface opposite the bottom surface along the main axis (A) and featuring a profile that is at least partially corrugated configured to at least prevent the displacement and/or rotation of the semiconductor body in the spark plug, the corrugated profile features alternating summits and troughs having ridges, the ridges of the summits are tangent to a first plane parallel to the plane of the bottom surface and the ridges of the troughs are tangent to a second plane parallel to the plane of the bottom surface.

2. The semiconductor body according to claim 1, wherein the upper portion comprises a peripheral surface that is substantially cylindrical around the main axis (A) and delimiting the interface.

3. The semiconductor body according to claim 1, wherein the interface comprises a rib that protrudes along the main axis.

4. The semiconductor body according to claim 3, wherein the rib features a cylindrical outer surface with a cylindrical axis perpendicular to the main axis.

5. The semiconductor body according to claim 3, wherein the interface comprises two protuberances that are diametrically opposed to one another on either side of the rib along a plane (C) perpendicular to the plane (B) of the bottom surface.

6. The semiconductor body according to claim 1, wherein the semiconductor is made of a ceramic material.

7. The semiconductor body according to claim 4, wherein the interface comprises two protuberances that are diametrically opposed to one another on either side of the rib along a plane (C) perpendicular to the plane (B) of the bottom surface.

8. The semiconductor body according to claim 1, wherein the interface features corrugations or waves that rise or fall about the main axis (A) along a circumferential direction.

9. The semiconductor body according to claim 1, wherein the bottom surface and a cylindrical wall of an edge of the outer electrode define a cavity where the spark plug ignites a mixture of air and fuel, the cylindrical wall being centered on the main axis.

10. A spark plug of a semiconductor type for a turbine engine, the spark plug comprising a free cylindrical end that extends along the main axis (A), the free end comprising, centered on the main axis, a central electrode, and an outer electrode,
wherein the spark plug comprising a semiconductor body revolving around the main axis, the semiconductor body is arranged between the central electrode and the outer electrode, the semiconductor body comprising a baseplate and an upper portion extending from the baseplate along the main axis, the baseplate comprising a bottom surface substantially defined in a plane (B) perpendicular to the main axis and a first conical surface intended to cooperate at least partially by form-fitting with a contact surface of said outer electrode of the spark plug,
wherein a predetermined radial clearance being provided between the semiconductor body and the outer electrode,
wherein the spark plug further comprising an insulating element attached to the semiconductor body and intended to insulate the central electrode from the outer electrode and to provide a support for the semiconductor body, at least partially against a contact surface of the outer electrode substantially along the main axis (A),
wherein the upper portion comprises an interface opposite the bottom surface along the main axis (A) and featuring a profile that is at least partially corrugated configured to at least prevent the displacement and/or rotation of the semiconductor body in the spark plug, the corrugated profile features alternating summits and troughs having ridges, the ridges of the summits are tangent to a first plane parallel to the plane of the bottom surface and the ridges of the troughs are tangent to a second plane parallel to the plane of the bottom surface.

11. The spark plug according to claim 10, wherein the insulating element is secured to the interface of the semiconducting body by means of glue.

12. A combustion chamber for a turbine engine comprising at least one of the spark plug according to claim 10.

13. A turbine engine comprising:
a combustion chamber of claim 12.

14. The spark plug according to claim 10, wherein the semiconductor body is located at the level of the free cylindrical end of the spark plug.

15. A turbine engine comprising:
at least a spark plug, wherein the spark plug is the spark plug of claim 10.

16. The spark plug according to claim 10, wherein the interface features corrugation or waves that rise or fall about the main axis (A) along a circumferential direction.

17. A semiconductor body revolving around a main axis (A) for a spark plug of a turbine engine, the semiconductor body comprising a baseplate and an upper portion extending from the baseplate along the main axis, the baseplate comprising a bottom surface substantially defined in a plane (B) perpendicular to the main axis and a first conical surface intended to cooperate at least partially by form-fitting with a contact surface of an outer electrode of the spark plug, wherein the upper portion comprises an interface opposite the bottom surface along the main axis (A) and featuring a profile that is at least partially corrugated configured to at least prevent the displacement and/or rotation of the semiconductor body in the spark plug, the corrugated profile features alternating summits and troughs having ridges, the ridges of the summits are tangent to a first plane parallel to the plane of the bottom surface and the ridges of the troughs are tangent to a second plane parallel to the plane of the bottom surface, wherein the interface comprises two protuberances that are diametrically opposed to one another on either side of the rib along a plane (C) perpendicular to the plane (B) of the bottom surface.

\* \* \* \* \*